US 8,185,804 B2

(12) United States Patent
Guo et al.

(10) Patent No.: US 8,185,804 B2
(45) Date of Patent: May 22, 2012

(54) APPARATUS AND METHOD FOR ERROR CORRECTION IN MOBILE WIRELESS APPLICATIONS INCORPORATING MULTI-LEVEL AND ADAPTIVE ERASURE DATA

(75) Inventors: Scott Guo, San Jose, CA (US); Manikantan Jayaraman, San Jose, CA (US)

(73) Assignee: ST-Ericsson SA, Plan-les-Ouates (CH)

( * ) Notice: Subject to any disclaimer, the term of this patent is extended or adjusted under 35 U.S.C. 154(b) by 866 days.

(21) Appl. No.: 12/067,074

(22) PCT Filed: Sep. 19, 2006

(86) PCT No.: PCT/IB2006/053381
§ 371 (c)(1),
(2), (4) Date: Nov. 7, 2008

(87) PCT Pub. No.: WO2007/034418
PCT Pub. Date: Mar. 29, 2007

(65) Prior Publication Data
US 2009/0259920 A1 Oct. 15, 2009

Related U.S. Application Data

(60) Provisional application No. 60/718,872, filed on Sep. 19, 2005.

(51) Int. Cl.
*H03M 13/00* (2006.01)
(52) U.S. Cl. ..................................... 714/776
(58) Field of Classification Search ............. 714/48–51, 714/52, 57, 704, 746, 752–761, 765, 766, 714/786, 787, 795, 798
See application file for complete search history.

(56) References Cited

U.S. PATENT DOCUMENTS
6,052,819 A * 4/2000 Barker et al. ................. 714/776
(Continued)

FOREIGN PATENT DOCUMENTS
GB 2402307 A 12/2004
(Continued)

OTHER PUBLICATIONS

Joki, H. "Modeling of DVB-H Link Layer," Internet Citation, Online, May 10, 2005, URL: http://www.netlab.tkk.fi/opetus/s38310/04-05/Kalvot_04-05/Joki_100505.ppt, pp. 1-35.
Joki, H; et al "Analysis of Reed-Solomon Coding Combined With Cyclic Redundancy Check in DVB-H Link Layer" Wireless Communication Systems, 2005. 2nd International Symposium on Siena, Italy, Sep. 5, 2005, pp. 313-317.

(Continued)

*Primary Examiner* — Nadeem Iqbal
(74) *Attorney, Agent, or Firm* — Potomac Patent Group PLLC

(57) ABSTRACT

A receiver (120) is configured to receive data over a communications link. A decapsulator (122) is coupled to the receiver and configured to create datagrams and erasure attributes associated with the datagrams. A decoder (124) is coupled to the decapsulator and configured to store the datagrams in a frame table and track the progression thereof to create codewords, the decoder storing the datagrams in table columns to create codewords in table rows, and configured to store the erasure attributes in an erasure table. A user interlace (126) is coupled to the decoder and configured to render images corresponding with the datagrams on the user interface. Advantages of the invention include improved signal reception and processing, and prolonged battery life in mobile wireless devices.

18 Claims, 8 Drawing Sheets

U.S. PATENT DOCUMENTS

| | | | |
|---|---|---|---|
| 7,151,754 B1 * | 12/2006 | Boyce et al. | 370/328 |
| 7,747,930 B2 * | 6/2010 | Pekonen et al. | 714/784 |
| 2007/0101228 A1 * | 5/2007 | Vesma et al. | 714/752 |
| 2007/0240027 A1 * | 10/2007 | Vesma et al. | 714/759 |
| 2007/0277077 A1 * | 11/2007 | Vesma et al. | 714/755 |

FOREIGN PATENT DOCUMENTS

| | | |
|---|---|---|
| GB | 2407946 | 5/2005 |
| GB | 2 415 873 | 1/2006 |
| JP | 2009509480 | 3/2009 |
| WO | 2004/079982 | 9/2004 |
| WO | 2004079982 A1 | 9/2004 |
| WO | 2004086670 A1 | 10/2004 |
| WO | 2006/085326 | 8/2006 |
| WO | 2006/125157 | 11/2006 |
| WO | 2008/038067 | 4/2008 |

OTHER PUBLICATIONS

De Diego Balaguer, E; et al "Performance Evaluation of Power Saving Strategies for DVB-H Services Using Adaptive MPE-FEC Decoding" Personal, Indoor and Mobile Radio Communications, 2005. IEEE 16th International Symposium on Berlin, Germany, Sep. 11, 2005, pp. 2221-2226.

Koppelaar, A G C; et al "Restoration of IP-Datagrams in the DVB-H Link-Layer for TV on Mobile" Consumer Electronics, 2006. ICCE '06. 2006 Digest of Technical Papers. Jan. 7, 2006, pp. 409-410.

Eerenberg, O; et al "IP-Recovery in the DVB-H Link Layer for TV on Mobile" Consumer Electronics, 2006. ICCE '06. 2006 Digest of Technical Papers. Jan. 7, 2006, pp. 411-412.

* cited by examiner

APPARATUS AND METHOD FOR ERROR CORRECTION IN MOBILE WIRELESS APPLICATIONS INCORPORATING MULTI-LEVEL AND ADAPTIVE ERASURE DATA

Wireless environments provide a challenge for high quality communication. The invention relates to techniques for improving error correction in mobile wireless applications while reducing memory, computational and power consumption requirements.

Advances in semiconductor manufacturing technologies and digital system architectures have resulted in very highly integrated circuits, which contain millions of transistors, along with various other components and interconnections. The integrated circuits that result from the aforementioned advances provide significant computational resources at relatively low costs. In turn, the availability of such integrated circuits has given rise to growth in the capabilities and varieties of consumer electronic products, and particularly mobile wireless products. One particular aspect of consumer electronic products is mobile and portable TV receivers.

Because of the ever-increasing demand for improved reception quality, more and more complex technologies have been employed in state-of-the-art mobile and portable TV receiver products that incorporate, or include, error correction functionality, or capability. Use of these complex technologies often results in undesirable consequences in terms of both cost and power consumption. For example, such signal processing capabilities typically require a large amount of memory in which to store input data, and further typically require fast computational resources. The extra memory and the high speed computational resources add to the cost and the power consumption of the products into which the error correction capabilities are incorporated.

The required amount of memory has become particularly large in some of the sophisticated processing algorithms that operate on large amount of input data and produce several output data, including intermediate results, which are stored for subsequent processing.

What is needed are methods and apparatus for providing error correction capabilities while reducing the cost and power consumption of products in which such capabilities are incorporated.

The invention provides an apparatus and method for improving the quality of reception in wireless devices.

An exemplary embodiment is a device that supports error correction. A receiver is configured to receive data over a communications link. A decapsulator is coupled to the receiver and configured to create datagrams and erasure attributes associated with the datagrams. A decoder is coupled to the decapsulator and configured to store the datagrams in a frame table and track the progression thereof to create codewords, the decoder storing the datagrams in table columns to create codewords in table rows, and configured to store the erasure attributes in an erasure table. A user interface is coupled to the decoder and configured to render images corresponding with the datagrams on the user interface. Advantages of the invention include the improve signal reception and processing, and prolong battery life in mobile wireless devices.

In one aspect of the invention, the erasure table includes a plurality of entries each of which is associated with a column in the frame table. In one aspect of the invention, the progress attributes include a continuity counter value and the erasure attributes include a multi-bit erasure value. In one aspect of the invention, the decoder is configured to receive each datagram and to check the continuity counter value associated with each datagram, and when the continuity counter is not consistent with predefined continuity count to discard the packet and mark the packet as an erasure. In one aspect of the invention, the decoder is configured to assign erasure attributes to maximize the number of correctable errors in each codeword. In one aspect of the invention, the decoder is configured to assign erasure attributes in an adaptive manner to maximize the number of correctable errors in each codeword. In one aspect of the invention, the decoder is configured to check a packet ID and discard packets that do not match a predetermined packed ID. In one aspect of the invention, the decoder is configured to check the continuity counter value and determine if the continuity counter value is properly incremented, and when not, to discard the data associated with the improperly incremented continuity counter value. In one aspect of the invention, the communications link is a wireless link and the data is digital television data.

Advantages of the invention include improved signal reception and signal processing, and prolonged battery life in mobile wireless devices.

The invention is described with reference to the following figures.

Figure 3A:
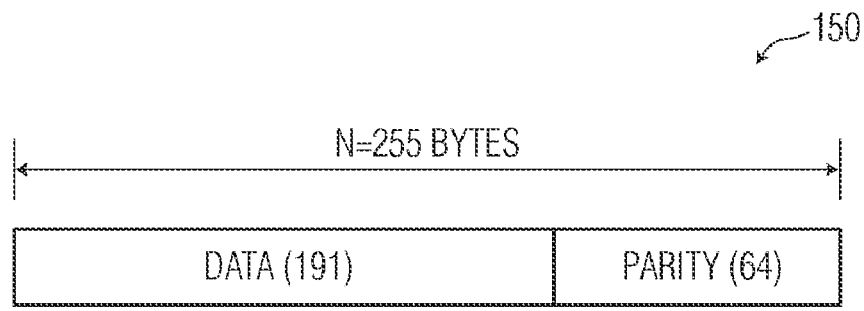
FIG. 3A depicts a Reed-Solomon codeword according to an embodiment of the invention.
Figure 3B:
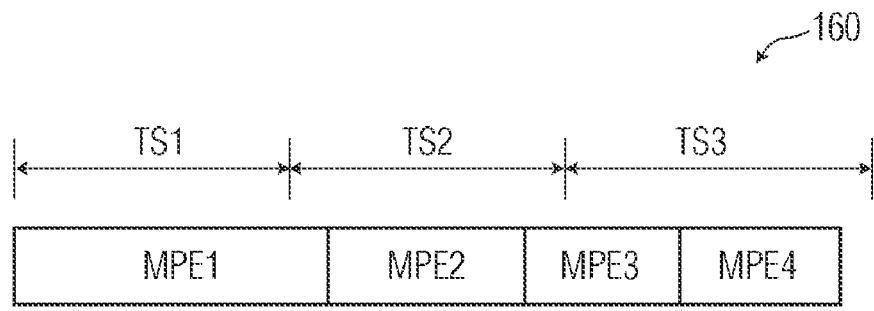
Figure 3C:
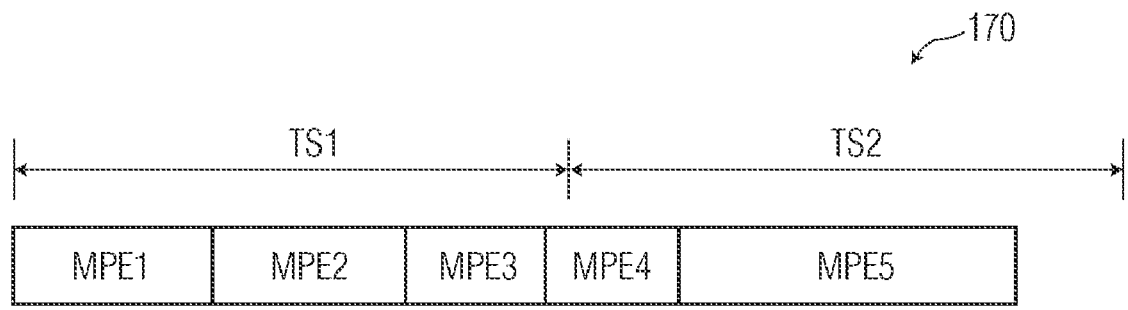

FIG. 3B-C depict the relationship between the transport packets and the MPE-FEC sections according to an embodiment of the invention.

Figure 4A:
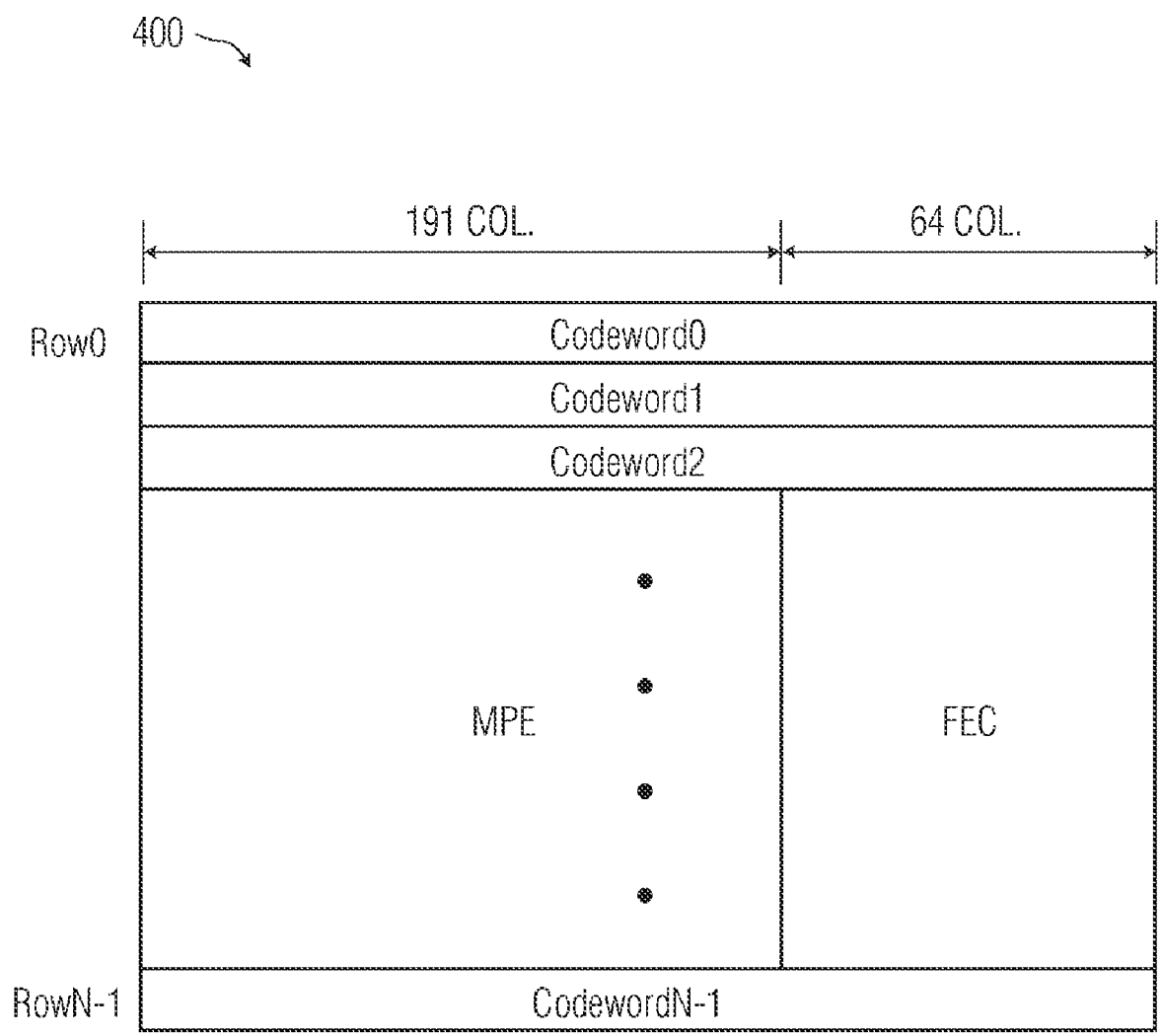
Figure 4B:
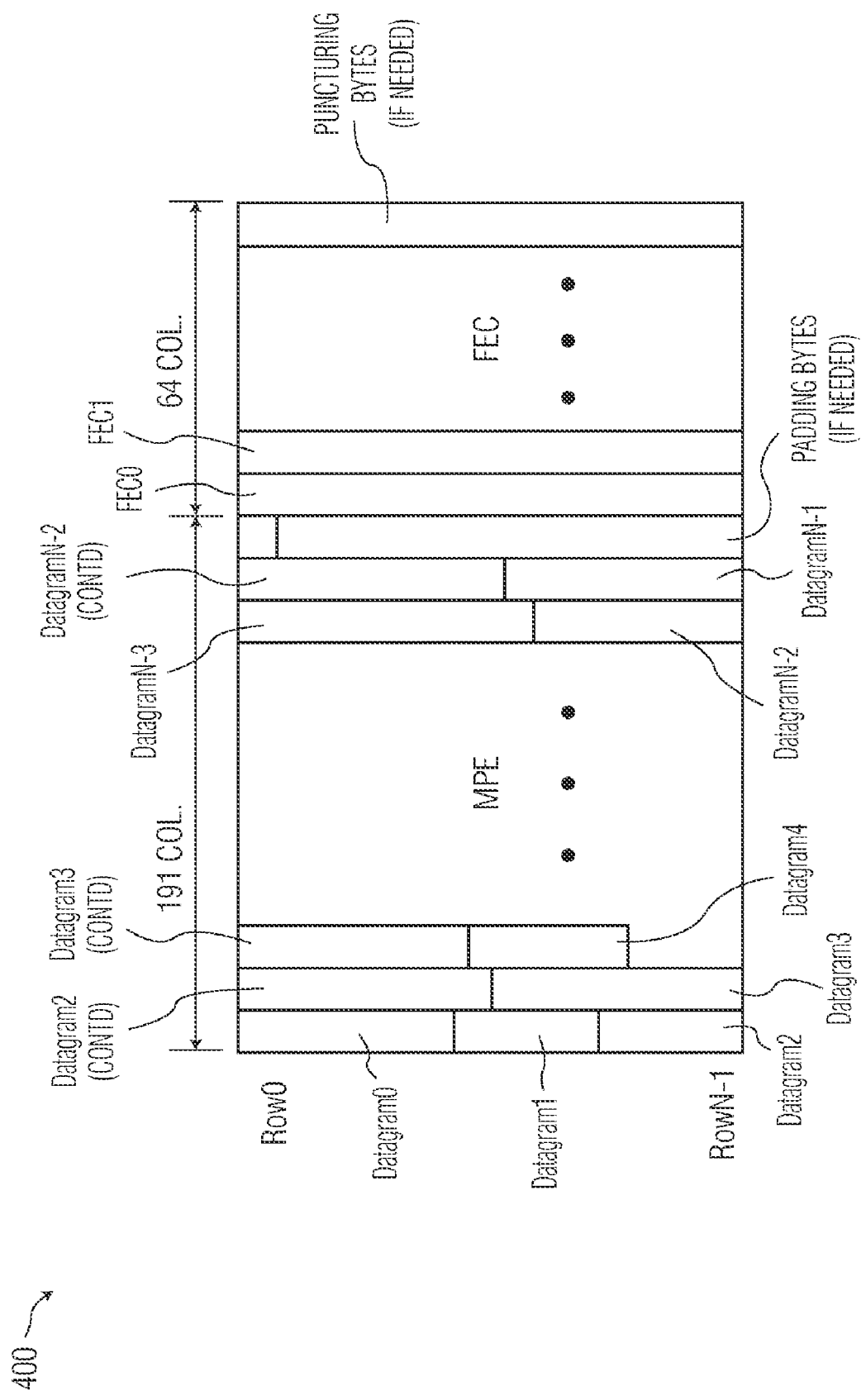

FIGS. 4A-B depict a memory table according to an embodiment of the invention.

Figure 4C:
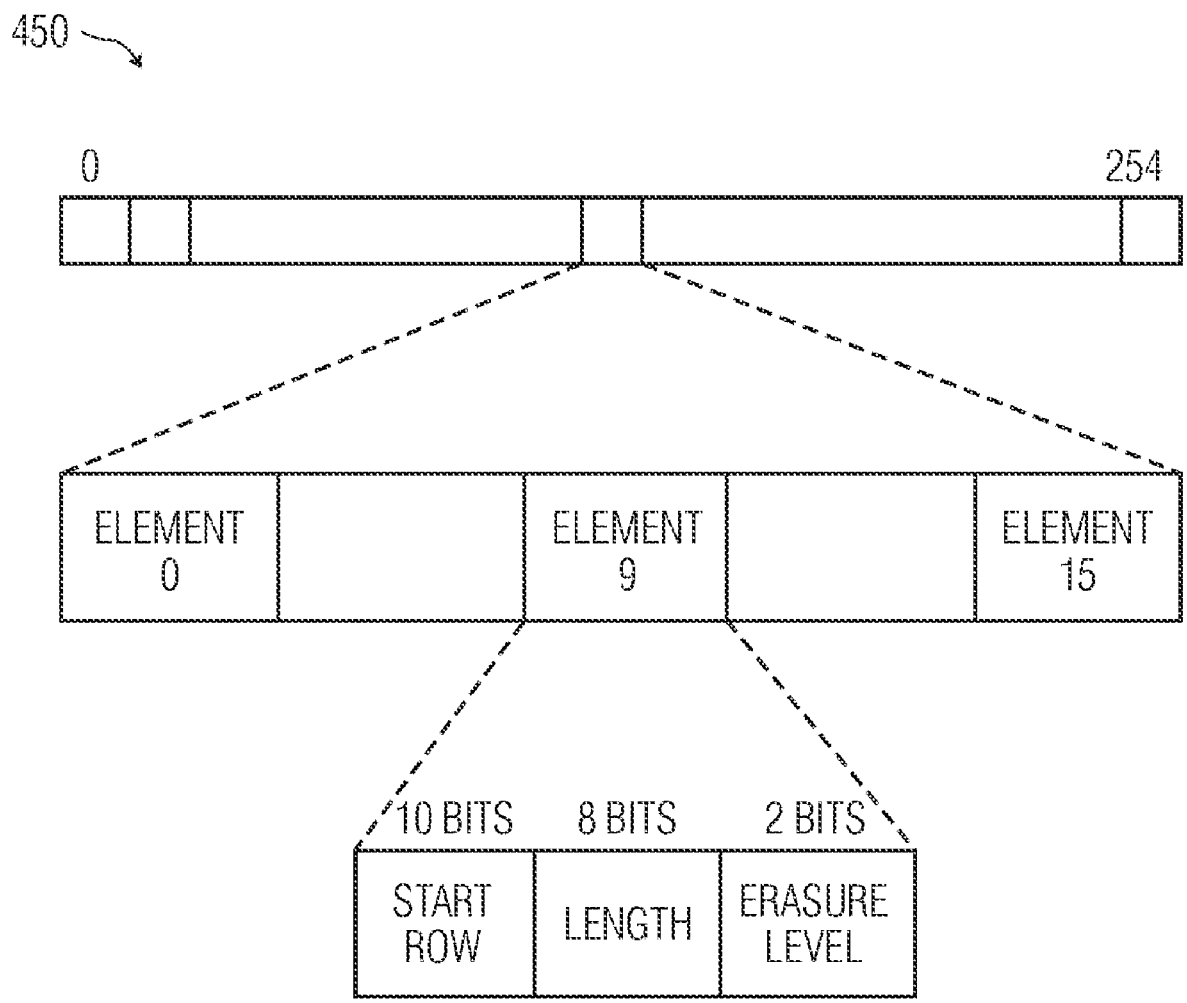

FIG. 4C depicts an erasure table according to an embodiment of the invention.

Figure 5A:
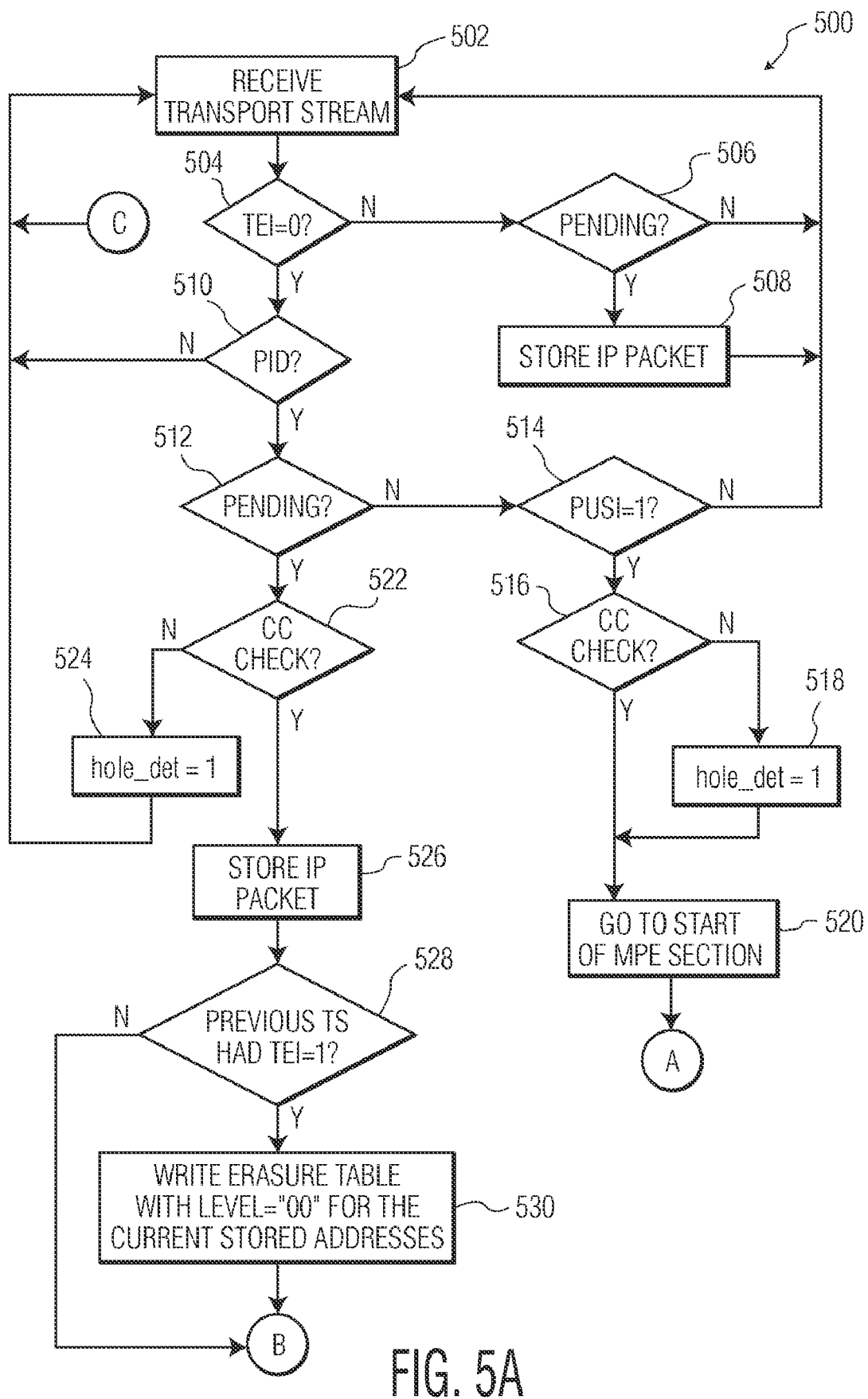
Figure 5B:
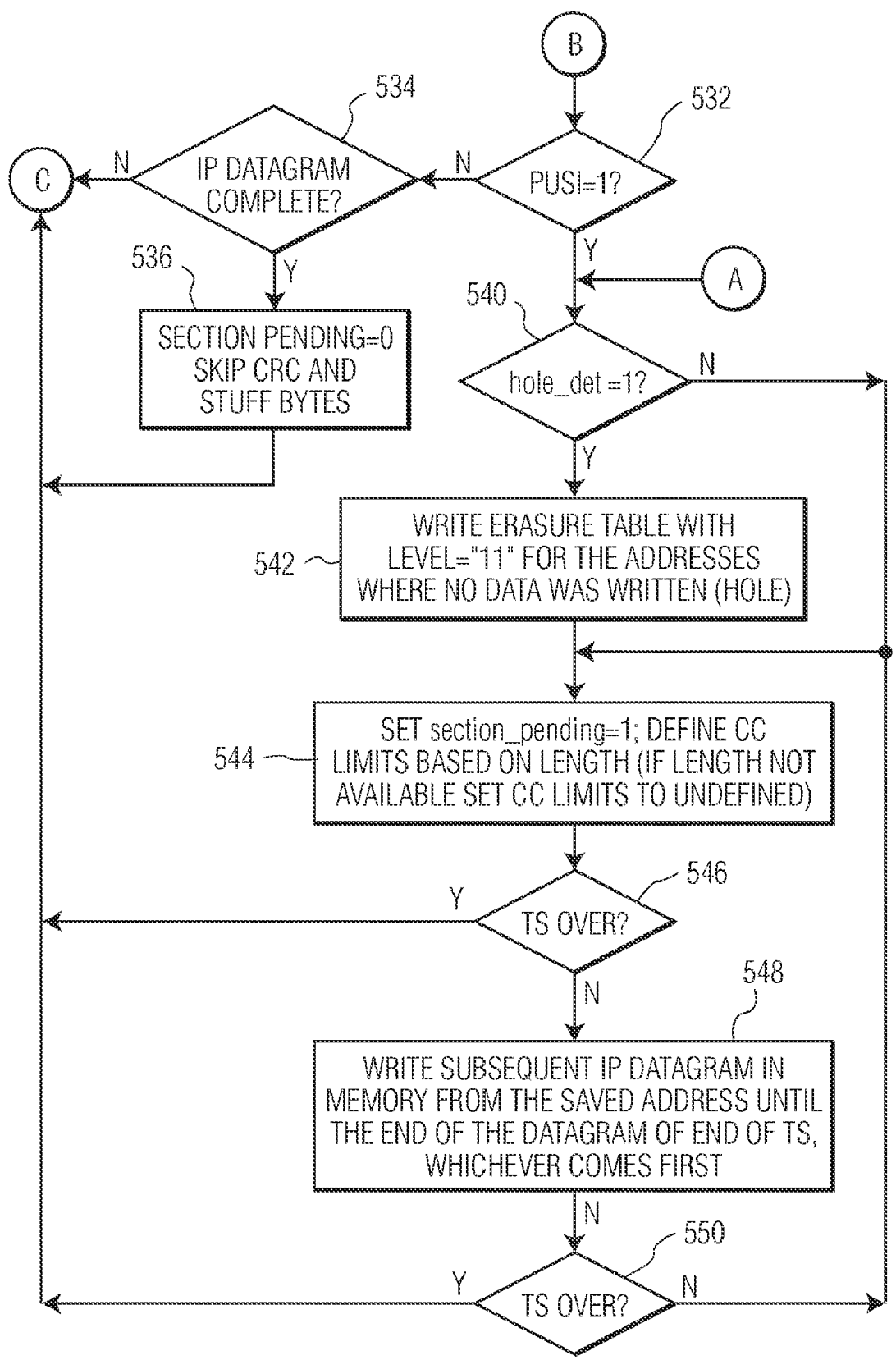

FIGS. 5A-B depict a flowchart according to an embodiment of the invention.

The invention is described with reference to specific embodiments. Those skilled in the art will recognize that the description is for illustration and to provide the best mode of practicing the invention. While references are made to specific wireless devices and protocols, the invention is applicable to many different types of communication mediums, devices and protocols. For example, while a wireless protocol is described herein, the invention is applicable to other protocols and communication techniques such as wireline communication, as well as analog and digital variations. Likewise, while Reed-Solomon error correction is described, other error correction techniques can be implemented in the invention. Additionally, while specific parameters such as packet size and memory size are described here, these are for purposes of example only since the invention may be used with other packet sizes, memory sizes, and so forth.

Figure 1:
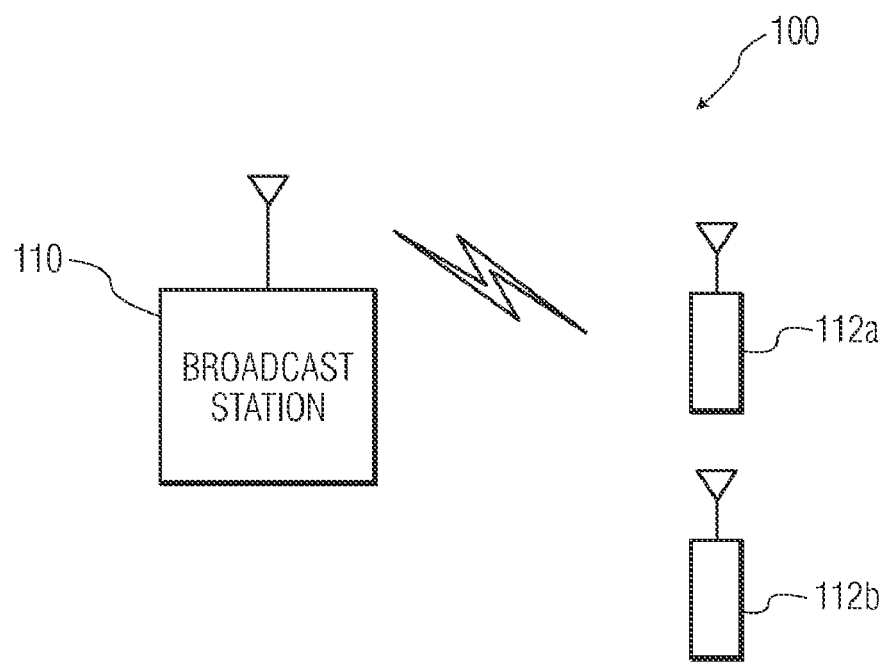
FIG. 1 depicts an exemplary wireless network according to an embodiment of the invention.

FIG. 1 depicts an exemplary wireless network 100 showing a broadcast station 110 and a number of wireless devices 112a-112b receiving a signal from the broadcast station. These devices have the ability to communicate with one another. The devices 112a-112b are, for example, television receivers, but could also be other mobile devices such as telephones, personal digital assistants (PDAs), laptop computers or other electronic devices. Moreover, some of these devices may be on battery power while others may be powered by an available power outlet. In some cases, the devices can also be connected to the network through a wired network e.g. Ethernet or cable connection.

Figure 2A:
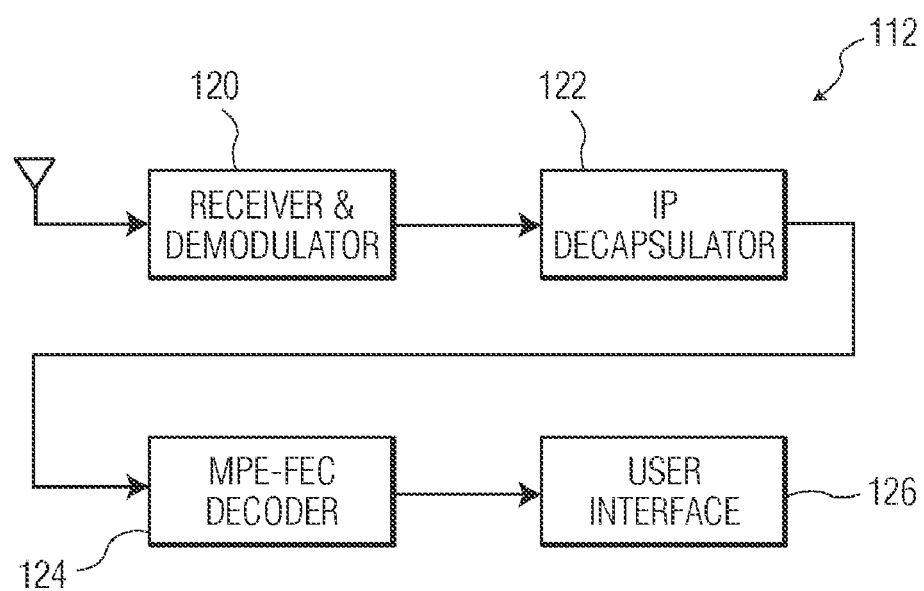
FIG. 2A depicts an exemplary device according to an embodiment of the invention.
Figure 2B:
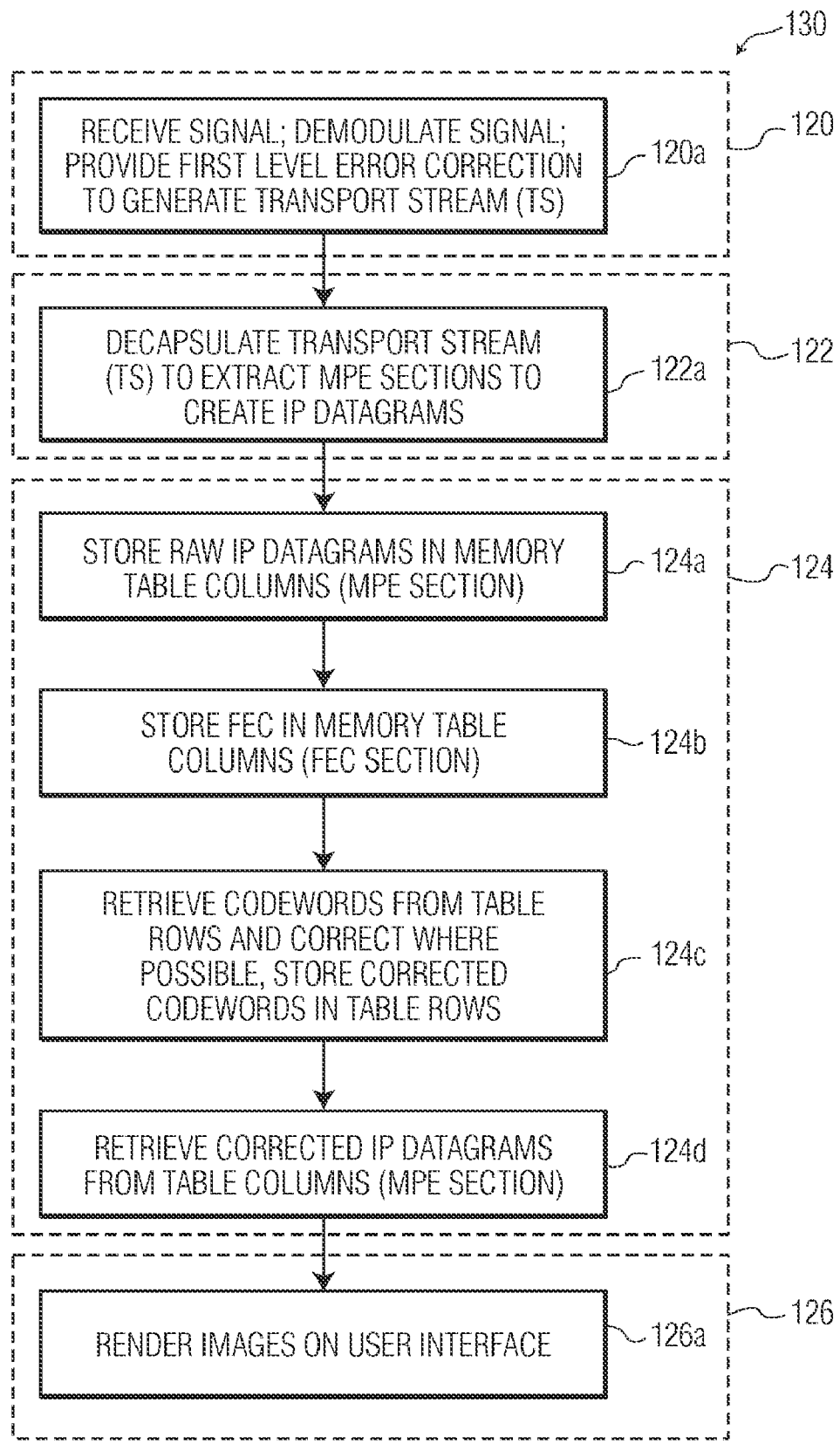
FIG. 2B depicts a flowchart showing methods performed in the exemplary device according to an embodiment of the invention.

FIG. 2A depicts an exemplary device 112 according to an embodiment of the invention. FIG. 2B depicts a flowchart showing methods performed in the exemplary device. A receiver and demodulator 120 receives an inbound signal, transforms the signal to a lower frequency, and creates a Transport Stream to make the signal available for processing. In one aspect, the receiver includes an error correction circuit that performs initial error correction on the demodulated packets and sets a Transport Error Indicator (TEI) if the TS packet is bad and cannot be corrected. An IP Decapsulater 122 performs initial processing on transport packets by decoding the inbound information into multi-protocol forward error correction (MPE-FEC) sections along with erasure information and parsing through the MPE-FEC sections to extract the raw IP datagrams. An MPE-FEC decoder 124 receives the MPE-FEC sections and processes the Reed-Solomon codewords according to embodiments of the invention, resulting in corrected IP datagrams. A user interface 126, e.g. source decoding and rendering circuit, processes the information for display on a user interface, e.g. television display.

For error correction, an exemplary embodiment uses Reed-Solomon codes. A Reed-Solomon encoder takes a block of digital data and adds extra "redundant" bits. Errors occur during transmission or storage for a number of reasons (for example noise or interference, scratches on a CD, etc). The Reed-Solomon decoder processes each block and attempts to correct errors and recover the original data. The number and type of errors that can be corrected depends on the characteristics of the Reed-Solomon code.

A Reed-Solomon code is specified as RS (n, k) with s-bit symbols. This means that the encoder takes k data symbols of s bits each and adds parity symbols to make an n symbol codeword. These are n–k parity symbols of s bits each. A Reed-Solomon decoder can correct up to t symbols that contain errors in a codeword, where 2t=n–k.

FIG. 3A depicts a Reed-Solomon codeword according to an embodiment of the invention. The Reed-Solomon codes used in the MPE-FEC is specified as RS (255, 191) with 8-bit symbols. This means that each codeword contains 255 code word bytes, of which 191 bytes are data and 64 bytes are parity. That is: n=255, k=191, s=8, 2t=64 and t=32. The decoder can correct any 32 symbol errors in the code word: i.e., errors in up to 32 bytes anywhere in the codeword can be automatically corrected. Given a symbol size s, the maximum codeword length n for a Reed-Solomon code is n=2s−1. For example, the maximum length of a code with 8-bit symbols (s=8) is 255 bytes. The amount of processing power required to encode and decode Reed-Solomon codes is related to the number of parity symbols per codeword. A large value of t means that a large number of errors can be corrected but requires more computational power than a small value of t. One symbol error occurs when any number of bits in a symbol are wrong.

Reed-Solomon algebraic decoding procedures can correct errors and erasures. An erasure occurs when the position of an erred symbol is known. A decoder can correct up to t errors or up to 2t erasures. In the exemplary embodiment, erasure information is estimated and manipulated to assist in identifying received symbols that are likely to contain errors. When a codeword is decoded, if 2x+y<2t (x errors, y erasures) then the original transmitted codeword can be recovered.

It is noted that the more erasures are known, the more errors can be corrected. Therefore, it is desirable that as many erasure as possible (up to 64, of course) can be identified prior to Reed-Solomon decoding. On the other hand, if symbols are wrongly marked as erasures, it will reduce the number of errors that Reed-Solomon decoder can correct. For example, suppose that there are 8 erasures, of which 6 are not error codes and are hence wrongly identified as erasures. The Reed-Solomon decoder can only correct (64−8)/2=28 errors and 2 erasures. On the other hand, if there are only 2 erasures identified in the first place, Reed-Solomon can then correct (64−2)/2=31 errors and 2 erasures. Therefore, it is desirable to provide a sound algorithm to reliably mark erasures.

FIGS. 3B-C depicts the relationship between the transport packets and the MPE-FEC packets according to an embodiment of the invention (not to scale). The formats for the transport stream (TS) packet and the datagram section are shown in Table 1 and Table 2, respectively. Note in FIG. 3A that there does not need to be a direct correspondence between the TS packet and the MPE packet, and an MPE packet can cross the boundary between one or more TS packets. One aspect of the invention is how to reconcile and reconstruct the MPE-FEC frame table 400 shown in FIG. 4A under all conditions.

TABLE 1

Transport packet format (in the order in which they appear in the transport packet. The first row, i.e. sync byte occurs first).

| Name | Number of bits | Description |
|---|---|---|
| Sync byte | 8 | Fixed value of 0x47. |
| Transport error indicator (TEI) | 1 | A value of '0' indicates no error. A value of '1' indicates that at least 1 bit error in the transport packet. |
| Payload unit start indicator (PUSI) | 1 | A value of '1' indicates there is at least an MPE section header in the payload of this transport packet. A value of '0' indicates there is no MPE section header in the payload of this transport packet. |
| Transp. priority | 1 | |
| PID | 13 | 0x0000: PAT; 0x0001: CAT; 0x0010-0x1FFFE: network, program map-, elementary-PID or other. 0x1FFF: null. |
| Transport scrambling control | 2 | 00 |
| Adaptation field control | 2 | 00: reserved; 01: no adapt field, payload only; 10: adapt field only, no payload; 11: adapt field and payload. |
| Continuity counter | 4 | |
| Adaptation field | 0 or 8 | Adaptation + stuffing |
| Payload | 183 or 184 | PES packets or PSI sections or packet stuffing bytes or private data. |

TABLE 2

MPE section format.

| Name | Number of bits | Description |
|---|---|---|
| Table ID | 8 | 0x3E indicates DSM CC section with private data (table 9-3 in ISO/IEC 138 18-6) |
| Section syntax indicator | 1 | 1: presence of CRC_32 field. |
| Private indicator | 1 | 0 |
| Reserve | 2 | 11 |

TABLE 2-continued

MPE section format.

| Name | Number of bits | Description |
| --- | --- | --- |
| Section length | 12 | The number of remaining bytes in the MPE section immediately following this field up to the end of the MPE section. |
| MAC address (bytes 6 and 5) | 16 | |
| Reserve | 2 | |
| Payload scrambling control | 2 | 00 |
| Address scrambling control | 2 | 00 |
| LLC SNAP flag | 1 | A value of '0' indicates that section carries an IP datagram without LLC SNAP encapsulation (mandated by IP datacast docs) |
| Current next indicator | 1 | Always 1. |
| Section number | 8 | 0: no fragmentation of payload over multiple MPE sections 1 . . . 255: fragment sequence number. |
| Last section number | 8 | Sequence number of the section carrying the last payload fragment. |
| MAC address (bytes 4 to 1) | 32 | |
| Data payload (IP datagram) | | |
| Section stuffing bytes | | |
| CRC_32 | | |

FIGS. 4A-B depict a memory frame table 400 according to an embodiment of the invention. The memory table includes a number of columns corresponding to the length of the desired codeword, which in this case is N=255 Bytes. The table includes a number of rows corresponding with the desired size of the table in memory.

The MPE-FEC frame table, which stores the input data of the MPE-FEC decoder, is structured as a matrix with 255 columns and a flexible number of rows. In one embodiment designed for the digital television DVB-H (digital video broadcasting-handhelds) transmission parameter signaling (TPS), the maximum allowed value for no_of_rows (RowN) is 1024, which makes the total MPE-FEC frame size almost 2 M bits.

Each position in the matrix hosts an information byte. The last part of the MPE-FEC frame, consisting of the 191 leftmost columns, is dedicated for IP datagrams and possible padding, and is called the application data table. The right part of the MPE-FEC frame, consisting of the 64 rightmost columns, is dedicated for the parity information of the FEC code and is called the Reed-Solomon (RS) data table. Each byte position in the application data table has an address ranging from 0 to 191×RowN. In the same way, each byte position in the RS data table has an address ranging from 0 to 64×RowN.

FIG. 4A shows an MPE portion and a FEC portion of the memory 400 for each codeword to be reconstructed by the invention. FIG. 4B shows how the IP datagrams are received and compiled into columns of the frame table 400.

As IP datagrams are extracted, they are introduced datagram-by-datagram, starting with the first byte of the first datagram in the upper left corner of the matrix and going downwards to the first column. The length of the datagram may vary arbitrarily from datagram to datagram. Immediately after the end of one datagram the following datagram starts. If a datagram does not end precisely at the end of a column, it continues at the top of the following column. When all datagrams have entered the application data table, any unfilled byte positions are padded with zero bytes, which make the leftmost 191 columns completely filled.

After all the leftmost 191 columns filled, the 64 parity bytes are filled to the MPE-FEC frame. The code used is Reed-Solomon RS (255, 191). Each row of the MPE-FEC table then contains one RS codeword. Some of the rightmost columns of the RS data table may be discarded and hence not transmitted, to enable puncturing, as shown in FIG. 4C. The exact number of punctured RS columns does not need to be explicitly signaled and may change dynamically between frames. With this also the RS data table is completely filled and the MPE-FEC frame is completed.

The MPE portion can include padding bytes that are transmitted in the TS to fill the portion of the table, which may occur at a variable length since the MPE section lengths are variable. The FEC section packets are normally full length since they are intended to be inserted into the FEC portion of the table as efficiently as possible. The FEC portion can include puncturing bytes, which are not transmitted, to fill the FEC portion of the table.

Regarding Erasures, the Reed-Solomon encoding RS (255, 191), which is the exemplary MPE-FEC decoding function specified by the DVB-H standard, can correct up to 32 errors in a 255 bytes codeword. If erasures are provided, however, RS (255, 191) can correct up to 64 erasures. Erasures indicate which bytes of the codeword are considered erroneous. Therefore, using erasure attributes can substantially increase the error correction capability of Reed-Solomon decoder.

Since MPE-FEC decoding begins when the MPE-FEC frame table 400 is filled, a memory of at least 2 Megabits is used in the exemplary embodiment to store the MPE-FFEC frame data alone, but other sizes may be used. If a handover function is supported, the MPE-FEC frame data memory size is doubled.

To store erasure information for each byte of the codeword in the MPE-FEC frame, a straightforward or conventional method stores at least 1 bit ('0' indicates non-erasure and '1' indicates erasure) for each byte of the codeword. That means, for the erasure table, a memory size of 255×1024 bits=255 K bits is used at the minimum. 510 K bits of memory is used if two bits are used (in order for erasure pre-processing as described later) to represent the erasure for each byte of the codeword. Again, if a handover function is supported, the amount of memory is doubled for the erasure table.

In one aspect, the decapsulator is configured to generate at least three levels of erasure attributes associated with the datagrams as shown in Table 3, which results in 2 bit erasure attributes. In this aspect, the decoder may be configured to selectively process codewords to create corrected codewords, wherein the selection is based at least in part on the attributes stored in the erasure table. Again, the decoder may be configured to selectively bypass codewords that the erasure table identifies as correct or having too many errors to correct. In this aspect, a concept of soft-erasures is introduced. A soft-erasure describes the likelihood of a symbol in a codeword being erroneous.

TABLE 3

Soft-Erasure Attributes

| Soft-Erasure Value | Description |
| --- | --- |
| 0 (00) | The probability of the symbol being erroneous is 0. |
| 1 (01) | The probability of the symbol being erroneous is less than 0.5. |
| 2 (10) | The probability of the symbol being erroneous is more than 0.5. |
| 3 (11) | The probability of the symbol being erroneous is 1. |

The soft-erasure value of each symbol in the codeword can be extracted, for example, from the received transport packet. For instance, if the TEI (transmission error indicator) bit of the transport packet is set to 1, the soft-erasure value of the payload in the transport packet can be assigned to 2, while the soft-erasure value is assigned to 1 if the TEI bit is set to 0. For padding bytes of the MPE application data table, or payload of the transport packets that pass CRC (cyclic redundancy checksum) check, for example, a soft-erasure value of 0 is assigned. For puncturing bytes of the MPE-FEC Reed-Solomon data table, for example, a soft-erasure value of 3 is assigned.

These examples show how the soft-erasure values may be determined. Other scenarios are possible for the soft-erasure value. For instance, the continuity count bits of a transport packet can be used to determine whether there are any packets dropped. In case a packet is dropped, the soft-erasure value of the whole packet can be assigned to 3, as it is certain that all symbols are erroneous.

While there are a number of techniques to construct the soft-erasure table, it is useful that the table be constructed in such a way that hard-erasures can be generated for each codeword and to minimize the table size. A simplified hard-erasure generator and small soft-erasure table translate to reduced cost and power consumption.

In one aspect of the current invention, hard-erasures are generated after the MPE-FEC frame is completely constructed and the soft-erasure table is filled. Hard-erasure value is binary. When its value is 1, it indicates the current symbol of the codeword is an erasure. When its value is 0, it indicates that the current symbol of the codeword is not an erasure. The hard-erasure is subsequently used by the Reed-Solomon decoder. The present invention, however, is not limited to a specific Reed-Solomon decoder implementation.

The hard-erasure generator is normally related to how the soft erasure table is constructed. In one aspect of the current invention, the hard-erasure generator produces hard-erasures for one complete codeword per execution. At the end of an execution, the hard-erasure generator determines that no Reed-Solomon decoding is necessary if either of the following conditions is met: (a) the hard-erasure of every symbol in the codeword is 0; or (b) the number of symbols whose hard-erasure is 1 exceeds the limitation of the Reed-Solomon decoder, i.e. 64 in the case of DVB-H. Normally, the first condition is met if and only if the soft-erasures of all symbols in a codeword are 0, and the second condition is met if and only if the soft-erasures of at least 65 (in the case of DVB-H) symbols in a codeword are not 0.

Note that the present invention also works with Reed-Solomon decoding that does not use erasures. In that case, the sole function of the hard-erasure generator is to determine whether or not Reed-Solomon Decoding is required. No hard-erasures are output to the Reed-Solomon decoding sub-module.

FIG. 4C depicts an erasure table 450 according to an embodiment of the invention. One aspect of the invention is that the decapsulator is configured to generate erasure attributes associated with the datagrams and the decoder is configured to store the erasure attributes in an erasure table. The decoder is configured to selectively process codewords to create corrected codewords, wherein the selection is based at least in part on the attributes stored in the erasure table. The decoder is configured to selectively bypass codewords that the erasure table identifies as correct.

As IP datagrams are decapsulated from the incoming transport stream packets, erasure information is extracted. The erasure table is implemented to store the erasure information for a whole MPE-FEC frame.

FIGS. 5A-B depict a flowchart 500 according to an embodiment of the invention. Referring to FIG. 5A, in step 502, the transport streams (TS) are received by the IP decapsulator 122. If the transport error indicator (TEI) is 1 (not 0), then the packet is deemed not necessarily valid by step 504 and step 506 checks whether the MPE section is pending. If it's not pending, then step 506 returns the method to step 502. When a TS is not necessarily valid (TEI=1) but still pending, step 506 assumes that the packet has a PID match and step 508 stores the transport packet payload in the contiguous bytes of the MPE-FEC frame 400. In this case, the erasure table 450 makes a note of this write with erasure level="01" or "10" (reliability of this data and address lies in between but not including 0 and 1). The packet actually may or may not have a PID match. This is determined later by checking the continuity counter of the packet and following packet in the sequence starting in step 510.

If the TEI is 1, then step 510 attempts to match the packet ID (PID) with the programmed ID. If the PID does not match, then the packet was not intended for the receiver (i.e. destined for a different receiver) and the packet is discarded and the method returns to step 502. If the PID does match, the method continues to step 512 to determine if the packet is pending. If not, then step 514 checks the payload unit start indicator (PUSI) to see if it is true (e.g. =1), and if not, returns the method to step 502. If PUSI=1, then step 516 checks the continuity counter to ensure that it is properly incremented by 1. If not, step 518 sets the hole detected register (hole_det). If so, step 520 goes to the start of the MPE section. In either event, the method continues to bubble A.

If the section is still pending in step 512, then step 522 checks the continuity counter (CC) to ensure that it is properly incremented (by 1 or within CC limits). If the CC is erroneous, step 524 sets the hole detected register (hole_det) and returns the method to step 502. If not, step 526 stores the IP packet in memory. Step 528 checks whether the prior TS had a TEI=1, and if so, writes the erasure table with a level="00" for the recently written addresses. In either event, the method continues to bubble B.

Referring to FIG. 5B, bubble B continues to step 532 which checks the payload unit start indicator (PUSI) to see if it is true (e.g. =1), and if not, step 534 checks whether the IP datagram is complete. If the IP datagram is complete, step 536 sets section pending negative (section_pending=0) and skips the CRC and stuff bytes. In either event, the method returns to step 502 via bubble C.

If step 532 is true, or if the method is continuing from bubble A, step 540 checks whether there is a hole detected. If so, step 542 writes the erasure table with level="11" for the current stored addresses. In either event, step 544 sets section pending affirmative (section_pending=1) and defines the CC limits based on length (if length not available set CC limits to undefined). Step 546 checks whether the TS is over, and if so, returns the method to step 502 via bubble C. If the TS is not over, step 548 writes the subsequent IP datagram in memory from the saved address until the end of the datagram of end of TS, whichever comes first. Then step 550 checks whether the TS is over, and if so, returns the method to step 502 via bubble C. If not, the method continues back to step 544 with the section pending and continues until the TS is over.

By following the aforementioned approach, the invention is able to mark the reliability information in an adaptive manner, thereby improving the performance of the MPE-FEC.

Note that it is assumed that the MPE-FEC module would have to handle only the transport packet with MPE sections carrying IP datagram. All the other transport packets carrying PAT, PMT information should be handled by a higher layer module.

The invention includes several key features including hierarchical marking and adaptive marking of erasures.

Hierarchical marking of erasures means that we classify the transport stream packets into four categories: (1) packets that are definitely not erasures; (2) packets that are definitely erasures; (3) packets that are unlikely to be erasures and (4) packets that are likely to be erasures. For these categories, we assign a two-bit erasure level of "00", "11", "01", and "11", respectively. The erasure levels of "01" and "10" can be adjusted as more information is gathered from the following transport stream packets.

Adaptive marking means that we know that for Reed-Solomon decoder, we can only mark up to 64 erasures for each codeword. If the number of transport stream packets with erasure level "11" reaches certain threshold (programmable) for a codeword, we re-mark the packets with original erasure levels "10" or "01" to "00". At least, when the codeword is passed to the Reed-Solomon decoder, packets with erasure level "11" are regarded as erasures (unreliable), while packets with erasure level "00" are regarded as "non-erasures" (reliable).

Advantages of such hierarchical and adaptive marking of erasures include several aspects. The hierarchical marking can achieve higher reliability than a straightforward marking which simply uses each transport stream packet in isolation. The hierarchical marking takes advantages of the packet sequence number and continuity counter and can thus improve the reliability. The invention can adaptively provide correction of maximum number of errors for correction. By using adaptive marking, our algorithm can mark the most number of erasures available for each codeword, and maximum erasures makes it possible to correct maximum number of errors Having disclosed exemplary embodiments and the best mode, modifications and variations may be made to the disclosed embodiments while remaining within the subject and spirit of the invention as defined by the following claims.

What is claimed is:

1. A device supporting error correction, comprising:
   a receiver configured to receive data over a communications link;
   a decapsulator coupled to the receiver and configured to create datagrams and erasure attributes associated with the datagrams;
   a decoder coupled to the decapsulator and configured to store the datagrams in a frame table and track the progression thereof to create codewords, the decoder storing the datagrams in table columns to create codewords in table rows, wherein the decoder is further configured to store the erasure attributes in an erasure table and to adaptively assign erasure attributes to maximize the number of correctable errors in each codeword; and
   a user interface connected directly to the decoder and configured to render images corresponding with the datagrams.

2. The device of claim 1, wherein the erasure table includes a plurality of entries each of which is associated with a column in the frame table.

3. The device of claim 1, wherein the progress attributes include a continuity counter value and the erasure attributes include a multi-bit erasure value.

4. The device of claim 3, wherein the decoder is configured to receive each datagram and to check the continuity counter value associated with each datagram, and when the continuity counter is not consistent with predefined continuity count to discard the packet and mark the packet as an erasure.

5. The device of claim 1, wherein the decoder is configured to assign erasure attributes to maximize the number of correctable errors in each codeword.

6. The device of claim 1, wherein the decoder is configured to check a packet ID and discard packets that do not match a predetermined packed ID.

7. The device of claim 3, wherein the decoder is configured to check the continuity counter value and determine if the continuity counter value is properly incremented, and when not, to discard the data associated with the improperly incremented continuity counter value.

8. The device of claim 3, wherein the decoder is configured to check the continuity counter value and determine if the continuity counter value is properly incremented, and when not, to assign a hole attribute to the data associated with the improperly incremented continuity counter value.

9. The device of claim 1, wherein the communications link is a wireless link and the data is digital television data.

10. A method of processing error correction, comprising:
    receiving data over a communications link;
    decapsulating the data to create datagrams and erasure attributes associated with the datagrams;
    decoding the datagrams by storing the datagrams in a frame table and tracking the progression thereof to create codewords, the decoder storing the datagrams in table columns to create codewords in table rows, and configured to store the erasure attributes in an erasure table and to adaptively assign erasure attributes to maximize the number of correctable errors in each codeword; and
    rendering images on a user interface corresponding with the datagrams on the user interface.

11. The method claim 10, wherein the erasure table includes a plurality of entries each of which is associated with a column in the frame table.

12. The method of claim 10, wherein the progress attributes include a continuity counter value and the erasure attributes include a multi-bit erasure value.

13. The method of claim 12, wherein the decoding step includes the steps of receiving each datagram and checking the continuity counter value associated with each datagram, and when the continuity counter is not consistent with predefined continuity count discarding the packet and mark the packet as an erasure.

14. The method of claim 10, wherein the decoding step includes the step of assigning erasure attributes to maximize the number of correctable errors in each codeword.

15. The method of claim 10, wherein the decoding step includes the steps of checking a packet ID and discarding packets that do not match a predetermined packed ID.

16. The method of claim 12, wherein the decoding step includes the steps of checking the continuity counter value and determining if the continuity counter value is properly incremented, and when not, discarding the data associated with the improperly incremented continuity counter value.

17. The method of claim 12, wherein the decoding step includes the step of checking the continuity counter value and determining if the continuity counter value is properly incremented, and when not, assigning a hole attribute to the data associated with the improperly incremented continuity counter value.

18. The method of claim 10, wherein the communications link is a wireless link and the data is digital television data.

* * * * *